Nov. 2, 1954     S. S. MADER ET AL     2,693,060
GRINDING MACHINE
Filed Feb. 3, 1953     2 Sheets-Sheet 1
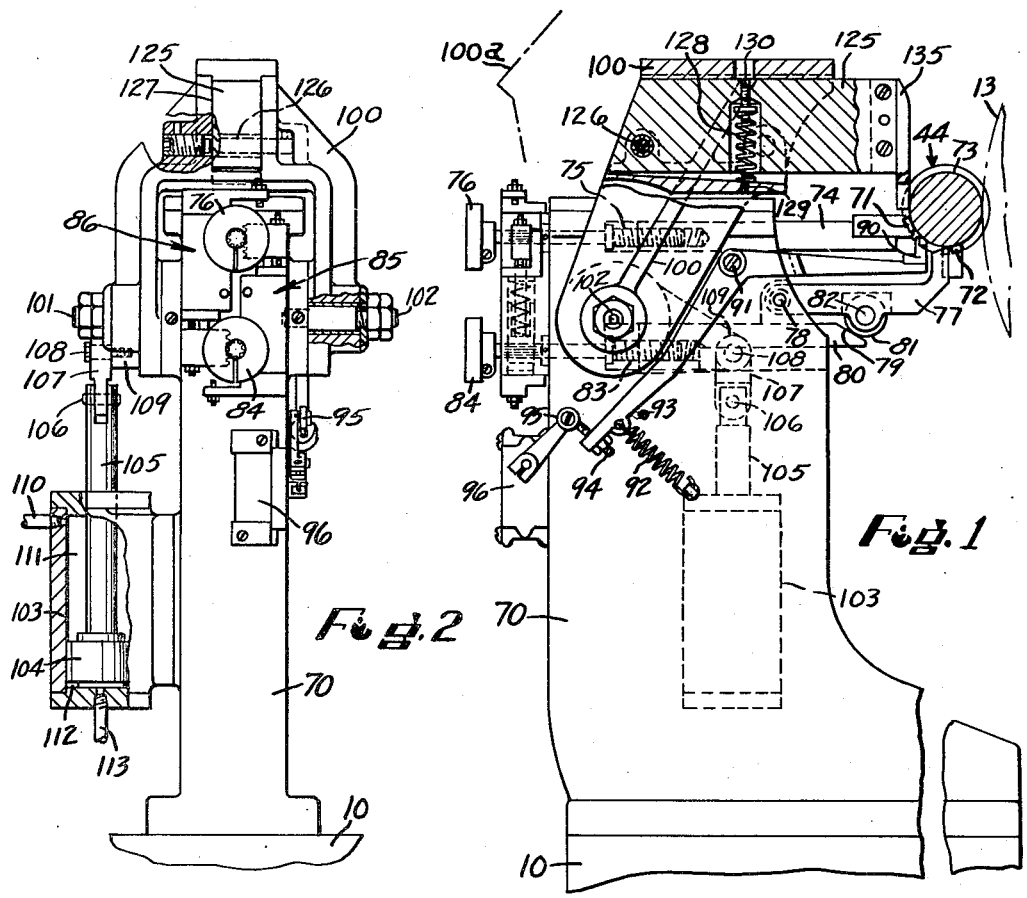
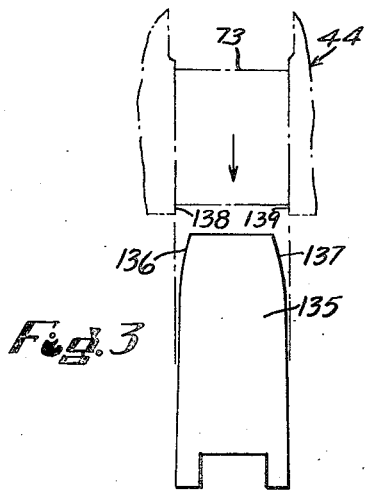
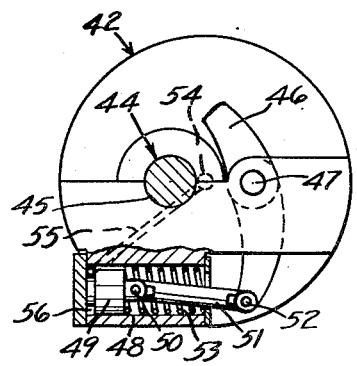
INVENTORS
STEWART S. MADER
HERBERT A. SILVEN
By Harold W. Eaton
Attorney

United States Patent Office 2,693,060
Patented Nov. 2, 1954

2,693,060

GRINDING MACHINE

Stewart S. Mader and Herbert A. Silven, Worcester, Mass., assignors to Norton Company, Worcester, Mass., a corporation of Massachusetts Application February 3, 1953, Serial No. 334,812

7 Claims. (Cl. 51—105)

This invention relates to grinding machines and more particularly to a work piece locating mechanism.

One object of the invention is to provide a simple and throughly practical work locating mechanism to position a rotatable work piece in an axial direction relative to the work support and grinding wheel. Another object is to provide a work locating mechanism for positioning a work piece having spaced shouldered portions thereon in an axial direction to position the portion of the work piece to be ground into alignment with the operative face of a grinding wheel to facilitate equalizing the side grinding of the wheel on spaced shouldered portions of the work piece. Another object of the invention is to provide a movable work locating device for moving the work piece axially as it is moved into operative engagement with the work supporting chucks to align the portion of the work piece to be ground with the operative face of the grinding wheel. Another object of the invention is to provide a work locating apparatus including a yieldably mounted member which is arranged to be engaged by opposed shouldered faces on a work piece to position the same in an axial direction as it is moved into operative engagement with the work supporting chucks and before it is clamped into position thereon. A further object of the invention is to provide a pivotally mounted support for the work positioning member to facilitate moving the work positioning member into either an operative or inoperative position. Other objects will be in part obvious or in part pointed out hereinafter.

In the accompanying drawings in which is shown one of various possible embodiments of the mechanical features of the invention:

Fig. 1 is an end elevation showing grinding machine steady rest, showing the crankshaft position mechanism mounted thereon, partly in section;

Fig. 2 is a front elevation of the steady rest and the crankshaft positioning mechanism;

Fig. 3 is a diagrammatic view of a crankpin being lowered into engagement with the positioning member;

Fig. 4 is an end elevation of one of the work supporting and rotating pot chucks.

Figure 5:
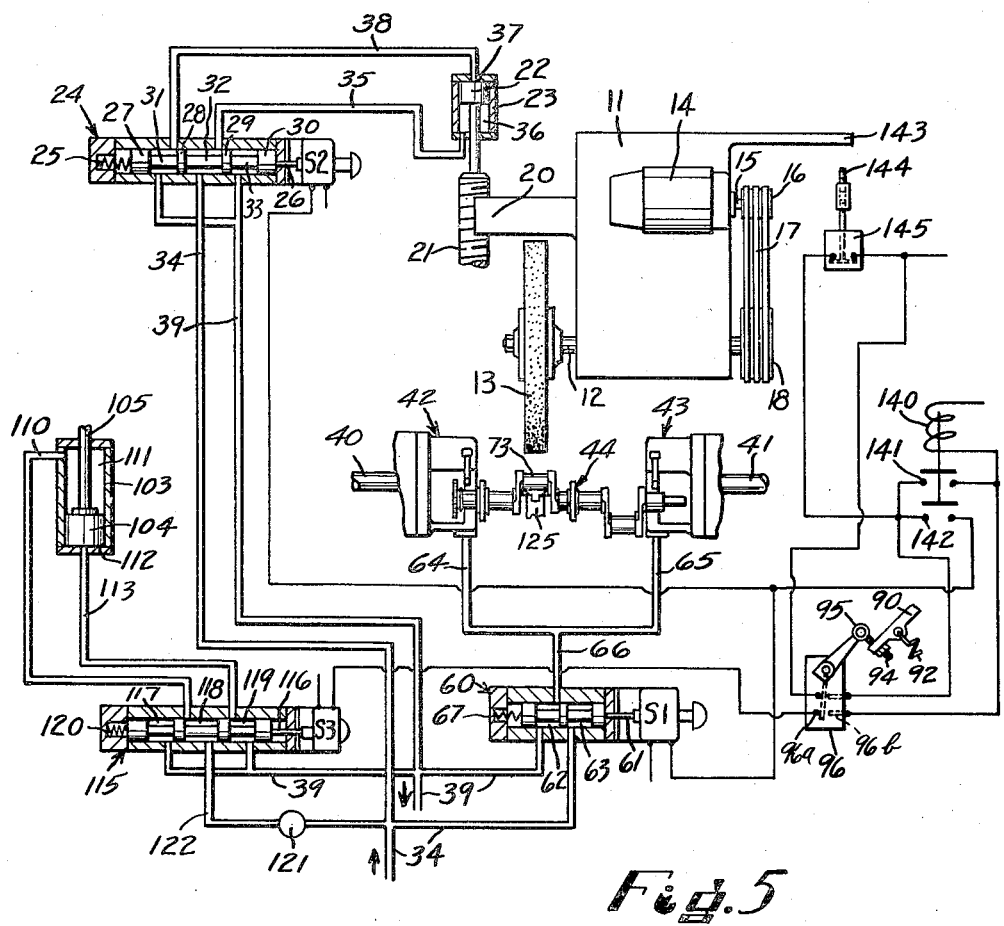
Fig. 5 is an electric and hydraulic diagram of the actuating mechanisms of the machine.

This invention is applicable to a machine such as that shown in the prior U. S. patent to H. A. Silven No. 2,151,666, dated March 21, 1939, to which reference may be had for details of disclosure not contained herein.

As illustrated in the drawings, a machine base 10 serves as a support for a transversely movable wheel slide 11 having a rotatable wheel spindle 12 suitably journalled therein in bearings (not shown). The wheel spindle 12 serves as a support for a grinding wheel 13 which is arranged to grind either the crankpin or main bearings of a crankshaft to be ground.

A suitable driving mechanism is provided for the grinding wheel 13 comprising a motor 14 mounted on the upper surface of the wheel slide 11. The motor 14 is provided with a motor shaft 15 having a multiple V-grooved pulley 16 thereon. The pulley 16 is connected by multiple V-belts 17 with a multiple V-grooved pulley 18 mounted on the right hand end of the wheel spindle 12 (Fig. 5). A feeding mechanism is provided for imparting a transverse feeding movement to the wheel slide 11. This mechanism may comprise a half nut 20 fixedly mounted on the wheel slide 11. The half nut 20 meshes with or engages a rotatable feed screw 21 which is rotatably supported in bearings (not shown) in the base 10. A power operated mechanism is provided for rapidly moving the wheel slide 11 to and from an operative position. This mechanism may comprise a piston 22 arranged in axial alignment with the feed screw 21. The piston 22 is slidably mounted within a cylinder 23.

A control valve 24 is provided for controlling the admission to and exhaust of fluid from the cylinder 23. The control valve 24 is a piston type valve comprising a valve stem 26 having a plurality of spaced valve pistons 27, 28, 29 and 30 formed integrally therewith. The valve pistons are spaced to form a plurality of valve chambers 31, 32 and 33. A compression spring 25 serves normally to maintain the valve stem 26 in a right hand end position. A solenoid S2 is provided which when energized serves to shift the valve stem 26 toward the left into a reverse position.

In the position of the valve 24 (Fig. 5) fluid under pressure from a suitable source is passed through a pipe 34 into the valve chamber 32 and passes through a pipe 35 into a cylinder chamber 36 to move the valve piston 22 upwardly into the position shown in Fig. 5 thereby retracting the wheel slide 11 to a rearward or inoperative position. During this movement of the piston 22 fluid within a cylinder chamber 37 may exhaust through a pipe 38, through the valve chamber 31, and out through an exhaust pipe 39.

When the solenoid S2 is energized, the valve stem 26 is moved toward the left (Fig. 5) to shift the valve parts into a reverse position so that fluid under pressure passing through the pipe 34 into the valve chamber 32 will pass through the pipe 38 into the cylinder chamber 37 to cause a downward movement of the piston 22 (Fig. 5) so as to impart a rapid approaching movement to the wheel slide 11 and the grinding wheel 13.

The base 10 also serves as a support for rotatably supporting a work piece to be ground. As illustrated in the drawings, a pair of spaced axially-aligned rotatable work spindles 40 and 41 are provided. A pair of pot chucks 42 and 43 are mounted on adjacent ends of the work spindles 40 and 41. The pot chucks 42 and 43 serve to rotatably support the opposite ends of a crankshaft 44 to be ground.

The pot chucks 42 and 43 are identical in construction and are old and well known in the art, consequently only one of the chucks has been illustrated in detail in Fig. 4. The pot chuck 42 is provided with a fixed half bearing 45 for supporting one end of a work piece to be ground. The pot chuck 42 is provided with a clamping jaw 46 pivotally supported by a stud 47. A hydraulically operated mechanism is provided for actuating the clamping jaw 46 comprising a cylinder 48 fixedly mounted on the pot chuck 42, the cylinder 48 contains a slidably mounted piston 49 which is connected by a stud 50 with one end of a link 51. The other end of the link 51 is connected by a stud 52 with the lower end of the clamping jaw 46. A compression spring 53 contained within the cylinder 48 serves normally to hold the piston 49 in an extreme left hand end position normally to maintain the clamping jaw 46 in an unclamped position.

When it is desired to clamp a crankshaft 44 in the pot chucks 42 and 43, fluid under pressure is passed through a passage 54 in the spindles 40 and 41 respectively, through a passage 55 into a cylinder chamber 56 to cause the piston 49 to move toward the right (Fig. 4) so as to rock the clamping jaw 46 in a counter-clockwise direction to clamp the ends of the crankshaft 44 in engagement with the bearing surfaces 45.

A control valve 60 is provided for controlling the admission to and exhaust of fluid from the pot chuck cylinders 48. The valve 60 is preferably a piston type valve comprising a valve stem 61 having a plurality of spaced valve pistons formed integrally therewith to form spaced valve chambers 62 and 63. A compression spring 67 serves normally to hold the valve stem 61 in a right hand end position. A solenoid S1 is operatively connected to the valve stem 61 and serves when energized to shift the valve stem toward the left to reverse the flow of fluid under pressure. In the position of the valve 60 (Fig. 5) fluid under pressure passing through the pipe 34 enters the valve chamber 63 and is blocked therein. The released compression of the springs 53 within the pot chucks 42 and 43 serves to exhaust fluid from the cylinders 48 through pipes 64 and 65 respectively, through a pipe 66, through the valve chamber 62 and out through the common exhaust pipe 39.

When the solenoid S1 is energized, the valve stem 61 is shifted to the extreme left hand end position so that the fluid under pressure from the pipe 34 entering the valve chamber 63 may pass through the pipe 66 and through the pipes 64 and 65 toward the pot chucks 42 and 43 respectively. Fluid under pressure entering the cylinder chambers 56 causes the piston 49 to move toward the right (Fig. 4) to rock the clamping jaws 46 in a counter-clockwise direction to clamp the opposite ends of the crankshaft 44 rigidly in position on the bearing surfaces 45 in the pot chucks 42 and 43 respectively.

The machine is provided with a work steadying rest having a base 70 which may be mounted on a work table or as shown in Figs. 1 and 2 on the base 10. The steady rest base 70 serves as a support for a pair of steady rest shoes 71 and 72 for steadying and supporting a crankpin 73 on the crankshaft 44 during a grinding operation. The steady rest shoe 71 is supported on a horizontally movable slide 74 which is slidably mounted on the steady rest base 70. An adjusting screw 75 having an actuating knob 76 is operatively connected to adjust the position of the steady rest shoe 71. The lower steady rest shoe 72 is supported on a pivotally mounted arm 77 supported by a stud 78 on the steady rest base 70. A cam 79 formed on a horizontally movable slide 80 is arranged to engage a roller 81 supported by a stud 82 on the arm 77. An adjusting screw 83 having an actuating knob 84 is provided to facilitate adjusting the position of the slide 80 and the cam 79 so as to vary the position of shoe 72 to maintain it in operative supporting engagement with the crankpin 73 during a grinding operation. By manual manipulation of the actuating knobs 76 and 84, the shoes 71 and 72 respectively may be maintained in the desired relationship with the crankpin 73 being ground.

If desired, a spring actuated fluid pressure actuated mechanism may be provided for moving the steady rest shoes automatically into and away from engagement with the pin 73. This mechanism may comprise a spring actuating hydraulic mechanism 85 for actuating the steady rest shoe 71 and a similar spring actuated hydraulic mechanism 86 may be provided for actuating the steady rest 72 in a manner substantially the same as that shown in the prior U. S. patent to H. A. Silven No. 2,567,620, dated September 11, 1951, to which reference may be had for details of disclosure not contained herein.

A work engaging feeler 90 is pivotally mounted on a stud 91 carried by the steady rest base 70. A tension spring 92 serves normally to exert a tension tending to rock the feeler in a counter-clockwise direction so that the downwardly extending arm of the feeler 90 engages a stop stud 93. The feeler 90 is arranged in the path of the crankpin 73 to be ground so that when the crankshaft is loaded into an operative position in the grinding machine, the crankpin 73 will engage the feeler 90 and rock it in a clockwise direction against the tension of the spring 92. During this rocking movement of the feeler 90, an adjusting screw 94 is arranged to engage an actuating roller 95 of a limit switch 96.

In the grinding of a crankpin 73 on the crankshaft 44 it is desirable to position the crankshaft 44 in an axial direction so that the opposed shoulders or cheeks of the crankpin 73 will be centered relative to the side faces of the grinding wheel 13 so as to equalize the side grinding. In the preferred form, it is desirable to position the crankshaft 44 in an axial direction as it is moved into operative supporting engagement with the pot chucks 42 and 43 respectively. A suitable mechanism is provided which is preferably mounted on the steady rest base 70 for positioning the crankshaft 44 axially. This mechanism may comprise a yoke-shaped arm 100 which straddles the upper portion of the steady rest base 70 and is pivotally supported thereon by a pair of aligned studs 101 and 102. The arm 100 is arranged so that it may be moved to and from an operative position by means of a hydraulically operated mechanism comprising a cylinder 103 which is fixedly mounted on the steady rest base 70. The cylinder 103 contains a slidably mounted piston 104 connected to the lower end of a piston rod 105. The upper end of the piston rod 105 is connected by a stud 106 with a link 107. The upper end of the link 107 is connected by a stud 108 with an arm 109 which is fixedly mounted on the yoke-shaped arm 100. When fluid under pressure is passed through a pipe 110 into a cylinder chamber 111, the piston 104 is moved downwardly so as to rock the arm 100 in a clockwise direction (Fig. 1) from an inoperative position 100a shown in broken lines in Fig. 1 into the full line position 100. During this movement fluid within a cylinder chamber 112 may exhaust through a pipe 113.

A suitable control valve 115 is provided for controlling the admission to and exhaust of fluid from the cylinder 103. This valve is preferably a piston type valve having a valve stem 116 formed with a plurality of spaced integral valve pistons forming a plurality of valve chambers 117, 118 and 119. A compression spring 120 serves normally to hold the valve stem 116 in a right hand end position. A solenoid S3 is provided which when energized as shown in Fig. 5, serves to shift the valve stem 116 toward the left. In this latter position of the valve 115, fluid under pressure from the pressure pipe 34 passes through a throttle valve 121 and through a pipe 122 into the valve chamber 118, through the pipe 110 into the cylinder chamber 111 to cause a downward movement of a piston 104 which moves the parts into an operative position. When the solenoid S3 is deenergized, fluid under pressure from the pipe 122 enters the valve chamber 118 and passes through the pipe 113 into the cylinder chamber 112 to cause an upward movement of the piston 104 so as to rock the yoke-shaped arm 100 in a counter-clockwise direction into the broken line position 100a (Fig. 1).

In order to center the crankpin 73 relative to the grinding wheel 13, a member 125 is pivotally supported by a stud 126 on the arm 100. The member 125 fits within a rectangularly shaped aperture 127 formed in the arm 100. A compression spring 128 is interposed between a stud 129 on the arm 100 and an adjusting screw 130 carried by the member 125. By manipulation of the screw 130, the compression of the spring 128 may be varied as desired so that the member 125 is free to yield relative to the arm 100 when engaged by the work piece in a manner to be hereinafter described.

The forward end of the member 125 is provided with a crankpin positioning member 135 having cam faces 136 and 137 formed on opposite edges thereof. The cam faces 136 and 137 are preferably formed with a curved portion adjacent the upper end thereof after which the faces gradually taper so that the lower portions thereof are spaced by a distance slightly greater than the maximum allowable distance between the cheeks 138 and 139 of the crankpin 73. The positioning member 135 is arranged so that when the crankshaft 44 is lowered in a substantially vertical direction into the grinding machine the cheek 138 or the cheek 139 will engage either the cam face 136 or the cam face 137 as the shaft is dropped into an operative position to cause an axial movement of the crankshaft 44 to center the shoulders 138 and 139 relative to the side faces of the grinding wheel 13 before the crankshaft is finally positioned in the pot chucks 42 and 43 respectively. After the shaft has been positioned in the pot chucks, the clamping jaws 46 are then actuated to lock shaft in operative supporting engagement therewith. The positioning member 135 is preferably accurately positioned so that the cam faces 136 and 137 are precisely centered relative to the respective side faces of the grinding wheel 13. When the crankshaft 44 is lowered into the machine, the cam faces 136 and 137 serve to cause an endwise or axial center movement of the shaft 44. After the shaft has been precisely centered, and when both of the cheeks or shoulders 138 and 139 move into operative engagement with the cam faces 136 and 137, further downward movement to position the shaft within the pot chucks 42 and 43 respectively will cause the member 125 to swing in a clockwise direction (Fig. 1) against the compression of the spring 128.

As shown in Fig. 5, the valves 24, 60 and 115 are positioned as shown and the yoke-shaped arm 100 is in an operative position with the positioning member 135 as shown in Fig. 1. When a crankshaft 44 is loaded into the machine, the crankpin 73 engages the feeler arm 90 and rocks it in a clockwise direction so that the screw 94 engages the actuating roller 95 to actuate the limit switch 96 thereby breaking the contacts 96a and closing the contacts 96b. The closing of the contacts 96b serves to energize a relay switch 140 to close the contacts 141 and 142. The closing of the contacts 141 sets up a holding circuit to maintain the switch 140 energized. The closing of the contacts 142 serves to energize the solenoid S1 thereby shifting the valve stem 61 so as to admit fluid under pressure through the pipe 66 to actuate the clamping jaws 46 to clamp the crankshaft in an operative position in the pot chucks 41 and 42. The closing of the contacts 141 serves also to energize a solenoid S2 to shift the valve stem 26 toward the left so that the fluid under pressure passes through the valve 24, through the pipe 38 into the cylinder chamber 37 to move the piston 22 so as to cause a rapid approaching movement of the wheel slide 11. When the contacts 96a of the limit switch 96 break, a circuit is broken to deenergize the solenoid S3 thereby releasing the compression of the spring 120 to shift the valve stem 116 toward the right so that fluid under pressure is passed through the pipe 113 to cause piston 104 to move upwardly thereby rocking the yoke-shaped arm 100 in a counterclockwise direction to an inoperative position before the clamping jaws clamp the shaft in the pot chucks 42 and 43. The solenoids S1 and S2 remain energized until the wheel slide 11 reaches its forwardmost position at which time a projection 143 on the wheel slide 11 engages the actuating plunger 144 of a normally closed limit switch 145 to open the same. The opening of the limit switch 145 serves to break the circuit thereby breaking the holding circuit of the relay switch 140 and also breaking the circuit to deenergize the solenoids S1 and S2 so that the wheel slide 11 moves to a rearward or inoperative position and the clamping jaws 46 are unclamped. When the crankshaft 44 is removed from the pot chucks 42 and 43, as the crankpin 73 moves away from the steady rest shoes 71 and 72, and away from the feeler arm 90, the released tension of the spring 92 rocks the feeler arm in a counter-clockwise direction thereby allowing the limit switch 96 to return to the position as shown in Fig. 5 which closes the circuit to again energize the solenoid S3 thereby shifting the valve 115 to pass fluid under pressure to the pipe 110 to cause a downward movement to the piston 104 to locate the yoke-shaped arm 100 from the full line position 100 (Fig. 1) into the broken line position 100a.

The operation of this improved crankshaft positioning mechanism will be readily apparent from the foregoing disclosure. The mechanism is preferably adjusted so that the work positioning member 135 when in an operative position as illustrated in Fig. 1 has its cam faces 136 and 137 centered relative to the side faces of the grinding wheel 13.

It will thus be seen that there has been provided by this invention apparatus in which various objects herein above set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

We claim:

1. In a grinding machine having a base, a transversely movable rotatable grinding wheel thereon, means to feed said wheel transversely in either direction, a work support on said base including a pair of spaced axially aligned rotatable pot chucks to support and rotate a work piece to be ground, a movably mounted arm on said base, means to move said arm to and from an operative position, an axial work positioning member yieldably mounted on said arm, and a pair of spaced cam surfaces on said member aligned with the side faces of the grinding wheel to engage spaced shouldered faces on a work piece axially to position the work piece so that the portion to be ground is aligned relative to the operative face of the grinding wheel as it is loaded into said pot chucks.

2. In a grinding machine having a base, a transversely movable rotatable grinding wheel thereon, means including a piston and cylinder to feed said wheel transversely in either direction, a work support on said base including a pair of spaced axially aligned rotatable pot chucks for supporting and rotating a work piece to be ground, and an axial work positioning mechanism including an arm pivotally mounted on said base, means including a piston and cylinder to move said arm to and from an operative position, a pivotally mounted work positioning member yieldably supported on said arm, and a pair of spaced cam faces on said member aligned with the side faces of the grinding wheel, said cam faces being arranged to engage spaced shouldered faces on a work piece axially to align the portion of the work piece to be ground relative to the grinding wheel as it is loaded into an operative position in the pot chucks.

3. In a grinding machine having a base, a transversely movable rotatable grinding wheel thereon, means including a piston and cylinder to feed said wheel transversely, a work support on said base including a pair of spaced axially aligned rotatable pot chucks for supporting and rotating a work piece to be ground, a pivotally mounted clamping jaw on each of said chucks, a piston and cylinder on each of said chucks for actuating said jaws, a movably mounted arm on said base, means including a piston and cylinder to move said arm to and from an operative position, a pivotally mounted axial work positioning member on said arm, and a pair of spaced cam faces on said member aligned with the side faces on grinding wheel engageable with spaced shouldered faces on a work piece axially to position the work piece relative to the grinding wheel as it is loaded into the pot chucks.

4. In a grinding machine having a base, a transversely movable rotatable grinding wheel thereon, means including a piston and cylinder to feed said wheel transversely, a solenoid-actuated control valve therefor, a work support on said base including a pair of spaced axially aligned rotatable pot chucks for supporting and rotating a work piece to be ground, a pivotally mounted clamping jaw on each of said chucks, a piston and cylinder on each of said chucks for actuating said clamping jaws, a solenoid-actuated control valve therefor, a pivotally mounted arm on said base, means including a piston and cylinder to move said arm to and from an operative position, a solenoid-actuated control valve therefor, a pivotally mounted axial work positioning member on said arm, and a pair of spaced cam faces on said member aligned with the side faces of the grinding wheel engageable with spaced shouldered faces on a work piece as it is loaded into the pot chucks axially to position the work piece relative to the grinding wheel, said cam faces being shaped so that spaced shouldered faces within required limits engage one or the other of said cam faces axially to move the work piece so as to center the shouldered faces relative to the operative face of the grinding wheel during the loading operation.

5. In a grinding machine, as claimed in claim 4, in combination with the parts and features therein specified of a pivotally mounted feeler arm operatively engaged by a work piece as it is positioned in the pot chucks, a limit switch in the path of said feeler arm to be actuated thereby to actuate said third solenoid valve to reverse the flow of fluid under pressure so as to move said arm to an inoperative position, said switch serving simultaneously to actuate the second solenoid valve so as to clamp the work piece in said pot chucks.

6. In a grinding machine having a base, a transversely movable rotatable grinding wheel thereon, means including a piston and cylinder to feed said wheel transversely, a work support on said base including a pair of spaced axially aligned rotatable pot chucks for supporting and rotating a work piece to be ground, a pivotally mounted clamping jaw on each of said chucks, a piston and cylinder on each of said chucks for actuating said jaws, a steady rest having work steadying shoes, a pivotally mounted arm on said steady rest, means including a piston and cylinder on said steady rest to move said arm to and from an operative position, a pivotally mounted axial work positioning member on said arm, and a pair of spaced cam faces on said member aligned with the side faces of the grinding wheel engageable with spaced shouldered faces on a work piece axially to position the work piece relative to the grinding wheel as it is loaded into the pot chucks.

7. In a grinding machine having a base, a transversely movable rotatable grinding wheel thereon, means including a piston and cylinder to feed said wheel transversely, a solenoid-actuated control valve therefor, a work support on said base including a pair of spaced axially aligned pot chucks for supporting and rotating a work piece to be ground, a pivotally mounted clamping jaw on each of said chucks, a piston and cylinder on each of said chucks for actuating said jaws, a solenoid-actuated control valve therefor, a steady rest on said base having work steady shoes, a pivotally mounted arm on said steady rest, means including a piston and cylinder on said steady rest to swing said arm to and from an operative position, a solenoid-actuated control valve therefor, a pivotally mounted axial work positioning member yieldably mounted on said arm, a pair of spaced cam faces on said member aligned with the side faces of the grinding wheel engageable with spaced shouldered faces on a work piece axially to position the work piece relatively to the grinding wheel as it is loaded into the pot chucks, a pivotally mounted feeler arm on said steady rest operatively engaged by a work piece as it is positioned in said pot chucks, and a limit switch in the path of said feeler arm to be actuated thereby to actuate the said third solenoid valve so as to swing the arm to an inoperative position, said switch serving simultaneously to actuate said second solenoid valve to clamp the work piece in said pot chucks.

References Cited in the file of this patent

UNITED STATES PATENTS

| Number | Name | Date |
|---|---|---|
| 732,314 | Norton | June 30, 1903 |
| 1,549,557 | Knowles | Aug. 11, 1925 |
| 1,858,222 | Silven | May 10, 1932 |
| 2,419,170 | Silven | Apr. 15, 1947 |
| 2,503,889 | Silven | Apr. 11, 1950 |
| 2,559,431 | Hollengreen | July 3, 1951 |